Patented Apr. 17, 1945

2,373,643

UNITED STATES PATENT OFFICE 2,373,643

ORGANIC SULPHONATES AND METHOD OF MAKING

Leland James Beckham, Geddes, N. Y., assignor to The Solvay Process Company, New York, N. Y., a corporation of New York No Drawing. Application December 30, 1941, Serial No. 424,941

16 Claims. (Cl. 260—500)

This invention relates to organic sulphonates of general utility and of particular value for use as detergents, wetting agents, dispersing agents, emulsifying agents and the like, and to methods for the manufacture of such products.

In my application Serial No. 221,707, filed July 28, 1938, issued as U. S. Patent 2,265,993 on December 16, 1941, I have described the manufacture of organic sulphonate products by forming an addition product of a nitrosyl halide with an unsaturated aliphatic compound or with mixtures thereof and reacting the addition product with alkali sulphite so as to replace the halogen atom with a sulphonate radical. Such products will be referred to hereinafter as "nitrosation-sulphitation products."

My application Serial No. 424,940 of even date, entitled "Derivatives of unsaturated compounds and methods of making" issued as United States Patent 2,336,387 on December 7, 1943, relates to the manufacture of nitrosation-sulphitation products from carboxylic-substituted unsaturated hydrocarbons and mixtures thereof.

The present invention is concerned with such products and particularly with an improved process whereby products having superior qualities may be obtained. The products of the present invention comprise organic sulphonates containing in addition to the sulphonate radical a sulphamate radical. I have found that the presence of the sulphamate radical in such products contributes materially to the utility of these products as detergents, wetting agents, emulsifying agents, and the like.

In the manufacture of organic sulphonates by the specific procedures described in my application Serial No. 221,707 there is some formation of sulphamate bodies. The products of the present invention are distinguished from such products in their substantially higher ratio of sulphamate to sulphonate radicals. Thus the products of the present invention contain at least one, and especially between one and two, sulphamate radicals for each two sulphonate radicals present; whereas the products prepared in accordance with the examples of my prior application contain a substantially lower ratio of sulphamate to sulphonate radicals.

The products of the present invention may be prepared from the same basic materials as set forth in my applications Serial No. 221,707 and Serial No. 424,940, referred to above. Nitrosyl chloride addition products of organic compounds containing non-aromatic C=C linkages, particularly olefins and their carboxylic derivatives such as unsaturated acids and their esters, salts, amides, and chlorides, and unsaturated acid nitriles constitute suitable starting materials. For the manufacture of products destined for use as detergents, wetting agents, emulsifying agents, and the like, compounds containing between 10 and 30 carbon atoms per ethylenic group, at least 8 of which are disposed as a continuous carbon chain, are preferred as the organic starting materials.

Of the olefins, the mono-olefins containing between 16 and 23 carbon atoms are especially suitable for the manufacture of cleansing agents, the olefins at the lower end of this range excelling in wetting and foaming power, those near the middle excelling as low temperature washing agents, and those at the higher end excelling as washing agents for relatively high temperature washing. However, there are no rigidly fixed boundaries between the materials suitable for wetting agents and those suitable for detergents, and the molecular structure may influence the properties of the products one way or another to shift the boundary between those materials most effective as detergents and those most effective as wetting agents. Moreover, the presence of materials most suitable as wetting and foaming agents in a product intended primarily for cleansing may have substantial advantages in accelerating wetting, and holding soil, thus expediting cleansing operations.

The olefinic compounds may be straight chain compounds or secondary or tertiary branched chain compounds, and may contain one or more double bonds per molecule. The double bonds may be located in a terminal position or in an intermediate position. Compounds most valuable for detergent purposes may be obtained from olefins and carboxylic-substituted olefins containing an olefinic linkage at the end of a carbon chain of at least 8 carbon atoms.

The source of the olefinic compound may be animal, vegetable, or mineral. Thus suitable olefins may be prepared by dehydrating alcohols obtained by hydrogenation of naturally occurring fats and oils, such as tallow, palm oil, cocoanut oil, olive oil, or the corresponding free acids, or the olefins may be prepared by the Fischer-Tropsch synthesis or by cracking waxes or by cracking or dehydrogenating natural or synthetic (Fischer-Tropsch) petroleum or petroleum fractions or by halogenating and dehydrohalogenating such materials or by polymerizing low molecular weight olefins.

Olefinic mixtures containing olefins and saturated hydrocarbons derived from natural or synthetic (Fischer-Tropsch) petroleum immediately or by thermolytic treatments constitute highly satisfactory initial materials for the manufacture of the products of the present invention. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons containing between 10 and 30 carbon atoms per molecule, may be segregated from less desirable products of the treatment by fractional distillation. Non-olefinic hydrocarbons may be permitted to remain and may be separated after the sulphitation treatment as water-insoluble oils. The petroleum may be fractionally distilled prior to the thermolytic treatment to provide an oil containing an increased proportion of the hydrocarbons containing 10 and more carbon atoms per molecule.

Examples of suitable olefins are cetene derived from spermaceti (and comprising for the most part cetene-1), 2-methyl pentadecene-2, dodecene-1, pentadecene-7, tricosene-11, nondecene-9, 10-methyl nondecene-9, and olefin-containing mixtures obtained by cracking topped, crude, natural or synthetic petroleum or by dehydrogenating a petroleum distillate such as gas oil or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Examples of suitable carboxylic substituted unsaturated hydrocarbons are butyl oleate, oleic acid, methyl oleate, isopropyl oleate, allyl stearate, allyl laurate, di-n-octyl-(octenyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenolic acid amide, 3-methyl-4-dimethyl-cyclopentane-1-carboxylic acid ester of allyl alcohol, $\Delta^2$-3-methyl-4-dimethyl-cyclopentene-1-carboxylic acid ester of butanol-1. Examples of other types of suitable unsaturated compounds are oleone and n-lauryl cyclohexene.

The NOCl addition products are believed to comprise largely organic nitroso chloro compounds having the chlorine atom and nitroso group upon adjacent carbon atoms (that is, attached to carbon atoms which formed the non-aromatic C=C linkage in the parent unsaturated organic compound), their isomeric oximes, and probably the chloroderivatives formed by substitution of chlorine for a remaining hydrogen of the nitroso-substituted carbon of the nitroso chloro compounds, and dimers of the nitroso chloro compounds. A considerable proportion of these products reacts further under the conditions of nitrosation to lose nitrogen and form products such as alpha-chlorohydrins and alpha-chloro-ketones. Hence the nitrogen content of the addition product as a whole may correspond to only 0.6 to 0.7 atom per ethylenic group.

In accordance with the preferred process of the present invention, the NOCl addition product of an organic compound containing at least one non-aromatic C=C linkage is reacted with a mixture of alkali sulphite and bisulphite in a molecular ratio of normal sulphite to bisulphite between 1:1 and 5:1 and in a proportion providing at least 2½, preferably between 2½ and 5, sulphite radicals for each mol of addition product, whereby an organic sulphonate composition is produced comprising sulphonated organic sulphamates in which the sulphonate and sulphamate radicals are attached to carbon atoms which formed the non-aromatic C=C linkage in the parent unsaturated organic compound. Three to four sulphite radicals per mol of addition product are especially suitable since they permit high efficiency without excessive dilution of the product by inorganic material. However the importance of the diluent effect of larger proportions depends upon the use for which the material is to be employed.

I have found that the presence of the alkali bisulphite within the limiting ratios of normal sulphite to bisulphite specified has a directing influence upon the course of the reaction and promotes the formation of products containing, in addition to sulphonate groups, mono- or di-valent sulphamate radicals. Not only are the products produced by this process especially satisfactory as detergents, wetting agents, and the like but the valuable water-soluble products are produced in higher yields than obtainable in the absence of the specified proportions of bisulphite. Moreover, they are produced with relatively little formation of colored by-products.

Examples of suitable alkali sulphites and bisulphites for use in the preferred process for making the products of the invention are sodium sulphite, sodium bisulphite, ammonium sulphite, ammonium bisulphite, potassium sulphite, and potassium bisulphite.

The sulphite-bisulphite solution may be prepared by employing the desired proportions of the two ingredients separately prepared, or by treating suitable materials to form the sulphite or bisulphite or both in a reagent solution. Thus an aqueous sodium carbonate or sodium sulphite solution may be treated with $SO_2$ or sodium metabisulphite to provide a solution of sodium sulphite and sodium bisulphite in appropriate proportions. Or an aqueous sodium sulphite solution may be acidified with an acidic material, such as sulphuric acid, hydrochloric acid, a phosphorus acid, or an acid salt of such an acid, for example sodium acid sulphate. The unreactive sodium salt formed may be retained in the product as a filler, or as an adjuvant.

It is of advantage to employ a proportion of aqueous sulphite bisulphite reagent such that between 40 and 100 mols of water are present in the mixture for each mol of nitrosyl chloride addition product. Also it is desirable to employ from about one mol to about 15 mols of a water-soluble organic liquid, such as ethanol or isopropyl alcohol, for each mol of addition product, as described in my application Serial No. 424,942 of even date, entitled "Manufacture of organic sulphonates."

The manufacture of the sulphonated sulphamates of the present invention by reaction of nitrosyl chloride addition products with alkali sulphite bisulphite reagent may be conducted at temperatures between 60° C. and 130° C. and at substantially atmospheric pressure, but higher or lower temperatures or pressures may be employed.

Alternatively the sulphonated sulphamates of the present invention may be prepared from suitable ketones by subjecting the selected ketone to monochlorination, reacting the monochlor ketone with sodium sulphite to form a sulphonated ketone, reacting the sulphonated ketone with hydroxylamine to form the corresponding sulphonated oxime, and either reacting the oxime with sulphur dioxide to form the sulphonated alkylidene sulphamate, or reacting the oxime with sodium bisulphite to form a sulphonated sulphamate bisulphite addition product, which by treatment with alkali may be transformed into the sulphonated alkylidene sulphamate, or reducing the oxime to an amino alkyl sulphonate, and sulphonating and neutralizing to convert the amino group to a sulphamate group.

They also may be prepared from monosulphonated ketones by reaction thereof with sodium sulphamate to form directly the sulphonated alkylidene sulphamates.

A yet different method involves treatment of an olefin, such as used in the preferred process, with chlor-sulphonic acid to form the corresponding chlor-substituted organic sulphonic acid, reacting the product with ammonia or sodamide to substitute an amino group for the chlorine, and sulphonating the resulting product. The alkali-metal salt of the product may be obtained by neutralization.

In those cases where the alkali-metal or ammonium salts are the immediate products of sulphitation, the free acids may be produced by acidification and other metal salts or amine salts, such as alkaline earth metal salts, heavy metal salts, methylamine salts, ethanolamine salts, and pyridine salts may be formed by treatment with the appropriate base or by other known treatments appropriate to the formation of the desired salt from sulphonic and sulphamic acids.

Example 1

A nitrosyl chloride addition product freed from excess NOCl by aeration and prepared from a distillate fraction of cracked, topped Olean crude (a Pennsylvania petroleum), which distillate fraction distilled at pressures of 425 to 4 mm. absolute at a constant temperature of 200° C., was divided into fractions. To one fraction of the nitrosyl chloride addition product three mols of sodium sulphite, three mols of isopropyl alcohol, and 70 mols of water were added for each mol of addition product. The temperature of the mixture was raised to 85° C. over a period of one hour and maintained at this point for 23 hours. The oil phase was then decanted off from the aqueous phase and the separated aqueous phase was diluted with between 2 and 3 times its volume of water and was treated to remove remaining traces of residual oil by extraction. An extractant such as petroleum naphtha or diethyl ether may be used. The resulting clear aqueous layer was then evaporated to secure the solid sulphonated organic sulphamate product. Another portion of the nitrosyl chloride addition product was mixed with 3 mols of sodium sulphite, 1 mol of sodium acid sulphite, 3 mols of isopropyl alcohol, and 70 mols of water per mol of addition product. This mixture was reacted in the same way as the first mixture and the aqueous solution was separated from oil, purified, and evaporated to obtain the solid sulphonated organic sulphamate product. The results of these two processes are tabulated below, designated A and B, respectively.

Table 1

|  | A | B |
| --- | --- | --- |
| Yield, mol per cent | 66 | 75 |
| Relative color | 6-7 | 4-5 |
| Lime resistivity (pts. per million) | 700 | 850 |

Products A and B contain as their main organic constituents sulphonated ketones, sulphonated amines, sulphonted alkylidene sulphamates, sulphonated alkyl sulphamates, and bisulphite addition products of sulphonated alkylidene sulphamates. However in product B the sulphamate constituents constitute more than 50% of the organic ingredients whereas product A contains between 15% and 20% less of the sulphamate constituents based on total organic ingredients.

Example 2

Four portions of a nitrosyl chloride addition product of the type employed in Example 1 were reacted with sodium sulphite with and without the addition of sodium bisulphite, other conditions of reaction and recovery being the same. The yield and color of the products are indicated in the following table.

Table 2

| Test | Mols sulphite per mol olefin | Mols bisulphite per mol olefin | Yield mol per cent | Relative color |
| --- | --- | --- | --- | --- |
| C | 3.0 | 0.0 | 66 | 6-7 |
| D | 2.5 | 0.5 | 75 | 4-5 |
| E | 2.0 | 1.0 | 74 | 5-6 |
| F | 3.0 | 1.0 | 79 | 4-5 |

Example 3

The process of Example 2 was repeated substituting the nitrosyl chloride addition product of a dehydrogenated gas oil for the addition product employed in Example 2. The following table shows the relation of the yield of detergent product to the ratios of sulphite to bisulphite and total sulphite to olefin employed.

Table 3

| Test | Mols sulphite per mol olefin | Mols bisulphite per mol olefin | Yield mol per cent |
| --- | --- | --- | --- |
| G | 1.9 | 0.6 | 58 |
| H | 3.0 | 0.0 | 50 |
| I | 2.6 | 0.4 | 60 |
| J | 2.2 | 0.8 | 59 |
| K | 1.8 | 1.2 | 56 |
| L | 4.0 | 0.0 | 56 |
| M | 3.5 | 0.5 | 60 |
| N | 3.0 | 1.0 | 61 |
| O | 2.5 | 1.5 | 59 |
| P | 3.8 | 1.2 | 64 |

Example 4

Two portions of a mixture of the nitrosyl chloride addition product derived from a dehydrogenated gas oil and unreacted olefin were treated with sodium sulphite solution and with mixed sodium sulphite bisulphite solution under otherwise similar conditions.

The yields for Tests Q and R in the following table are based on the olefin employed. Since a considerable amount of unreacted olefins was present, these yields are not directly comparable with other examples but are comparable with each other. The results were as follows:

Table 4

| Test | Mols sulphite per mol olefin | Mols bisulphite per mol olefin | Yield mol per cent | Relative color |
|---|---|---|---|---|
| Q | 4.0 | 0.0 | 35 | 16 |
| R | 2.5 | 1.5 | 46 | 3-4 |

*Example 5*

Three portions of a nitrosyl chloride addition product of a dehydrogenated gas oil were treated in the same manner as in Example 4 with the following results:

Table 5

| Test | Mols sulphite per mol olefin | Mols bisulphite per mol olefin | Yield mol per cent | Relative color |
|---|---|---|---|---|
| S | 4.0 | 0.0 | 64 | 14-16 |
| T | 3.0 | 1.0 | 69 | 3-4 |
| U | 2.5 | 1.5 | 68 | 3-4 |

The yields in Tests S, T, and U are representative of the yields obtainable from dehydrogenated gas oil olefin addition products. A comparison of the yields in Tests S and U with those in Tests Q and R indicates that the mixture used in Example 4 probably contained between ⅓ and ½ of its initial olefin content unreacted.

*Example 6*

In order to follow the changes in composition of the reagent during a process of the type described in the preceding examples a nitrosyl chloride addition product of a dehydrogenated gas oil was treated with sodium sulphite and sodium sulphite bisulphite mixtures and the sulphite and bisulphite concentrations were determined at intervals by eletrometric titration of spot samples. The following results were obtained.

Table 6

| | Test | | | | |
|---|---|---|---|---|---|
| | V | W | X | Y | Z |
| Total mols sulphite | 3.00 | 3.00 | 3.00 | 3.00 | 4.00 |
| Mols Na₂SO₃ at start | 3.00 | 2.67 | 2.33 | 2.00 | 3.00 |
| Mols NaHSO₃ at start | 0.00 | 0.33 | 0.67 | 1.00 | 1.00 |
| Mol ratio Na₂SO₃/NaHSO₃ after— | | | | | |
| 0.00 hours | ∞ | 8.09 | 3.48 | 2.00 | 3.00 |
| .25 hours | 22.60 | 4.75 | 3.69 | 1.34 | 1.96 |
| .50 hours | 18.20 | 3.96 | 3.47 | 1.20 | 1.87 |
| .75 hours | 16.70 | 3.48 | 3.53 | 1.04 | 1.82 |
| 1.0 hours | 17.80 | 3.48 | 3.48 | 0.81 | 1.83 |
| 1.5 hours | 17.90 | 4.03 | 3.86 | 0.66 | 1.69 |
| 2.0 hours | 19.40 | 3.89 | 3.50 | 0.59 | 1.86 |
| 2.5 hours | 18.70 | 4.53 | 3.72 | 0.59 | 1.84 |
| 3.0 hours | 19.40 | 4.86 | 4.34 | 0.42 | 2.02 |
| 4.0 hours | 18.60 | 4.45 | 4.33 | 0.49 | 2.07 |
| 5.0 hours | 24.60 | 4.74 | 5.62 | | 2.16 |
| 6.0 hours | 27.40 | 5.68 | 4.05 | 0.15 | 2.27 |
| 24.0 hours | 49.40 | 5.14 | 1.64 | 0.00 | 2.07 |

The following examples further illustrate the practice of the present invention. For simplicity of disclosure, the examples have been set forth in tabular form. The general procedure for preparation of the products in each case was as follows:

A nitrosyl chloride addition product was prepared from each of the specified carboxylic-substituted olefins by passing nitrosyl chloride into the compound at the temperature and for the time period indicated in Table 7. The number of gram atoms of nitrogen and chlorine introduced per mol of substituted olefin also is indicated in this table.

The reaction product, comprising the nitrosyl chloride addition product of the carboxylic-substituted olefin as well as unreacted material, was mixed with an aqueous sulphitation reagent and heated to a temperature between 84° and 100° C. for a period of time between 24 and 48 hours as indicated in the table. In each case the mixture was heated gradually to the indicated reaction temperature over a period of 1 hour. After completion of the sulphitation, two volumes water per volume sulphitation liquor were added and the resulting solution extracted 6 times with ethyl ether using about ½ part ether by volume per part original sulphitation liquor. Solid detergent was recovered from the extracted aqueous phase by use of a laboratory double drum dryer.

Table 7

| | Mass values are expressed in gram atoms or mols per mol of substituted olefin | | |
|---|---|---|---|
| | Example 7 | Example 8 | Example 9 |
| Olefinic material | n-Butyl oleate. | Oleic acid. | Allyl stearate. |
| Mols NOCl passed | 2.5 | 2.5 | 2.5. |
| Nitrosation time hours | 4 | 4 | 4. |
| Nitrosation temp °C | 25 | 25 | 25. |
| Gram atoms N introduced | 0.42 | 0.54 | 0.14. |
| Gram atoms Cl introduced | 1.18 | 1.06 | 0.28. |
| Mols Na₂SO₃ | 3 | 3 | 3. |
| Mols NaHSO₃ | 1 | 1 | 1. |
| Mols H₂O | 70 | 70 | 70. |
| Mols 2-propanol | 3 | 3 | 3. |
| Sulphitation time hours | 24 | 24 | 22. |
| Sulphitation temp °C | 84 | 86 | 86. |
| Mol per cent yield on olefinic material | 67 | 85 | 63. |

The products prepared by the nitrosation-sulphitation procedure herein described normally comprise, in addition to sulphonated alkyl and alkylidene sulphamates and bisulphite addition products of the latter, other sulphonated products such as sulphonated ketones and sulphonated amines.

The feature of gradually raising the temperature of the reactants to reaction temperature during the sulphitation as described in connection with Examples 1, 7, 8, and 9 is the subject of my application Serial No. 424,943 of even date, entitled "Sulphitation of organic compounds."

It should be understood that in the appended claims where "sulphite radicals" are referred to it is intended to include both the sulphite radicals of the alkali sulphite, i. e., the normal sulphite, and of the alkali bisulphite. It also should be understood that, where ranges are given, the ranges include the limits.

I claim:

1. As a new product, an organic sulphonate composition derived from an unsaturated organic compound containing a non-aromatic C=C linkage, and comprising sulphonated organic sulphamates in which the sulphonate and sulphamate radicals are attached to carbon atoms which, in the parent unsaturated organic compound, formed said non-aromatic C=C linkage, said composition containing at least one organic sulphamate radical for each two organic sulphonate radicals present in the composition.

2. As a new product having surface-active properties, an organic sulphonate composition derived from an unsaturated organic compound containing at least one non-aromatic C=C linkage and between 10 and 30 carbon atoms per molecule, and comprising sulphonated organic sulphamates in which the sulphonate and sulphamate radicals are attached to carbon atoms which, in the parent unsaturated organic compound, formed said non-aromatic C=C linkage, said composition containing at least one organic sulphamate radical for each two organic sulphonate radicals present in the composition.

3. As a new product having surface-active properties, a mixture of organic sulphonates derived from an unsaturated organic compound containing a non-aromatic C=C linkage and between 10 and 30 carbon atoms per molecule, said mixture comprising sulphonated organic sulphamates in which the sulphonate and sulphamate radicals are attached to carbon atoms which, in the parent unsaturated organic compound, formed said non-aromatic C=C linkage, said composition containing between one and two organic sulphamate radicals for each two sulphonate radicals present in the mixture.

4. As a new detergent product, a mixture of detergent salts of organic sulphonic acids, comprising sulphonated organic sulphamates with between 10 and 30 carbon atoms per molecule, including sulphonated alkylidene sulphamates, sulphonated alkyl sulphamates, and sulphonated alkylidene sulphamate bisulphite addition products, said mixture comprising between one and two organic sulphamate radicals for each two organic sulphonate radicals present in the mixture.

5. As a new product having surface active properties, a mixture of organic sulphonates comprising sulphonated organic sulphamates with between 10 and 30 carbon atoms per molecule, including sulphonated alkylidene sulphamates, sulphonated alkyl sulphamates, and sulphonated alkylidene sulphamate bisulphite addition products, said mixture containing at least one organic sulphamate radical for each two organic sulphonate radicals present in the mixture.

6. As a new product having surface active properties, a mixture of hydrocarbon sulphonate sulphamates, the hydrocarbon radicals of which correspond to the mono-olefins present in an olefinic oil fraction consisting essentially of hydrocarbons containing not less than 10 nor more than 30 carbon atoms per molecule and obtained by thermolytic treatment of petroleum, said mixture containing at least one sulphamate radical for each two sulphonate radicals present in the mixture.

7. As a new product having surface active properties, a mixture of hydrocarbon sulphonate sulphamates, the hydrocarbon radicals of which correspond to the mono-olefins present in an olefinic oil fraction consisting essentially of hydrocarbons containing not less than 16 nor more than 23 carbon atoms per molecule and obtained by thermolytic treatment of petroleum, said mixture containing between one and two sulphamate radicals for each two sulphonate radicals present in the mixture.

8. As a new product having surface active properties, a mixture of hydrocarbon sodium sulphonate sodium sulphamates, the hydrocarbon radicals of which correspond to the mono-olefins present in an olefinic oil fraction consisting essentially of hydrocarbons containing not less than 16 nor more than 23 carbon atoms per molecule and obtained by thermolytic treatment of petroleum, said mixture containing between one and two sodium sulphamate radicals for each two sodium sulphonate radicals present in the mixture.

9. The method of making a sulphonated organic sulphamate product, which comprises reacting a nitrosyl chloride addition product of an organic compound containing at least one non-aromatic C=C linkage with a mixture of alkali sulphite and bisulphite, the ratio of normal sulphite to bisulphite present in the reaction mixture during at least a portion of the reaction period being between 1 and 5 mols of normal sulphite for each mol of bisulphite.

10. In the manufacture of a sulphonated organic sulphamate product, the improvement which comprises reacting a nitrosyl chloride addition product of an organic compound containing at least one non-aromatic C=C linkage with an aqueous sulphite solution containing at least 2½ sulphite radicals per mol of addition product present in the reaction mixture, the ratio of normal sulphite to bisulphite present in the reaction mixture during at least a portion of the reaction period being between 1 and 5 mols of normal sulphite for each mol of bisulphite.

11. The method of making a sulphonated organic sulphamate product, which comprises reacting a nitrosyl chloride addition product of an organic compound containing at least one non-aromatic C=C linkage with an aqueous mixture of alkali sulphite and bisulphite the ratio of normal sulphite to bisulphite present in the reaction mixture during at least a portion of the sulphitation being between 1 and 5 mols of normal sulphite for each mol of bisulphite.

12. The method of making a sulphonated organic sulphamate product having surface active properties, which comprises reacting the addition product of nitrosyl chloride and an organic compound containing at least one non-aromatic C=C linkage and not less than 10 nor more than 30 carbon atoms per non-aromatic C=C linkage with an aqueous mixture of alkali sulphite and bisulphite the ratio of normal sulphite to bisulphite present in the reaction mixture during at least a portion of the sulphitation being between 1 and 5 mols of normal sulphite for each mol of bisulphite.

13. The method of making a sulphonated organic sulphamate detergent product, which comprises reacting the addition product of nitrosyl chloride and an olefinic compound comprising not less than 10 nor more than 30 carbon atoms per olefinic group with an aqueous mixture of alkali sulphite and bisulphite containing initially between 1 and 5 mols of normal sulphite for each mol of bisulphite, in such proportion that at least 2½ sulphite radicals are initially present in the mixture for each mol of nitrosyl chloride olefinic addition product.

14. The method of making a sulphonated organic sulphamate detergent product, which comprises reacting the addition product of nitrosyl chloride and a mono-olefin comprising not less than 10 nor more than 30 carbon atoms per molecule with an aqueous mixture of alkali sulphite and bisulphite in such proportion that between 2½ and 5 sulphite radicals are initially present in the mixture for each mol of nitrosyl chloride olefin addition product, and maintaining during a major portion of the reaction period a mol ratio of normal sulphite to bisulphite between 1 and 5.

15. The method of making a sulphonated organic sulphamate product, which comprises reacting with an aqueous mixture of alkali sulphite and bisulphite containing between 1 and 5 mols of normal sulphite for each mol of bisulphite the addition product of nitrosyl chloride and a mono-olefinic oil fraction consisting essentially of hydrocarbons containing not less than 10 nor more than 30 carbon atoms per molecule and obtained by thermolytic treatment of petroleum.

16. The method of making a sulphonated organic sulphamate product, which comprises reacting at a temperature between 60° C. and 130° C. a mixture of the addition product of nitrosyl chloride and a mono-olefinic oil fraction, consisting essentially of hydrocarbons containing not less than 16 nor more than 23 carbon atoms per molecule and obtained by thermolytic treatment of petroleum, with an aqueous alcoholic alkali sulphite bisulphite sulphitation reagent containing between 1 and 5 mols of normal sulphite for each mol of bisulphite, and between 2½ and 5 sulphite radicals, between 1 mol and 15 mols of isopropyl alcohol, and between 40 mols and 100 mols of water for each mol of addition product present in the mixture, and maintaining throughout substantially the entire sulphitation period a sulphite to bisulphite ratio within the aforesaid limits.

LELAND JAMES BECKHAM.